No. 767,839. PATENTED AUG. 16, 1904.
J. B. SECOR.
TABULATING DEVICE FOR TYPE WRITING MACHINES.
APPLICATION FILED OCT. 21, 1903.
NO MODEL. 3 SHEETS—SHEET 3.
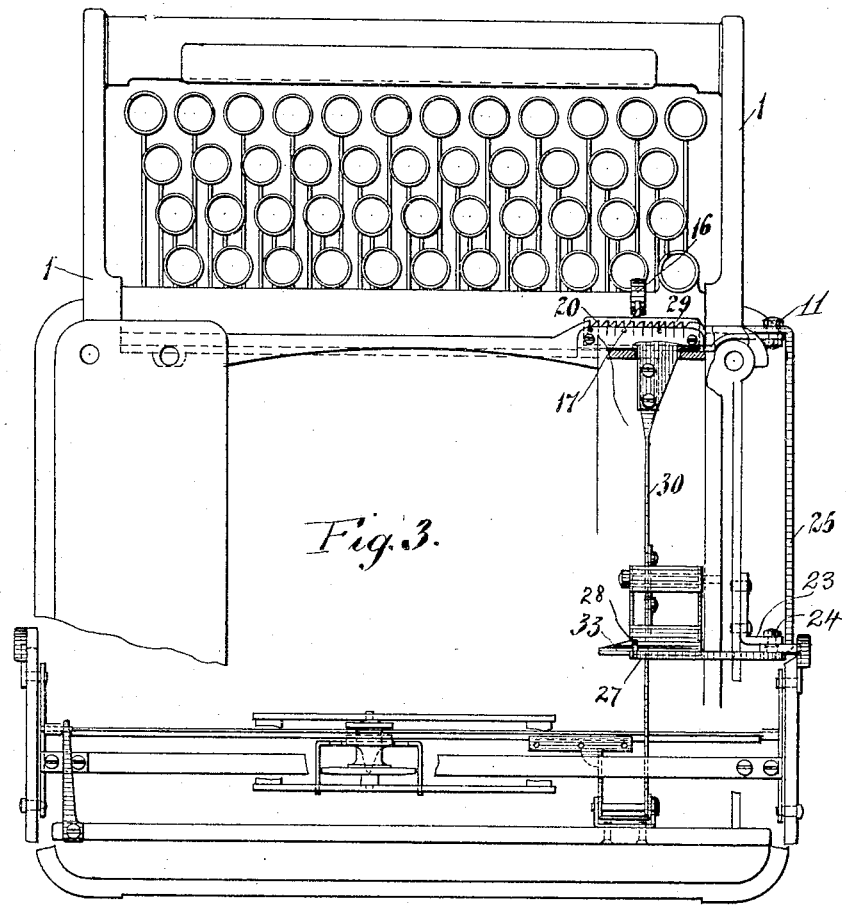

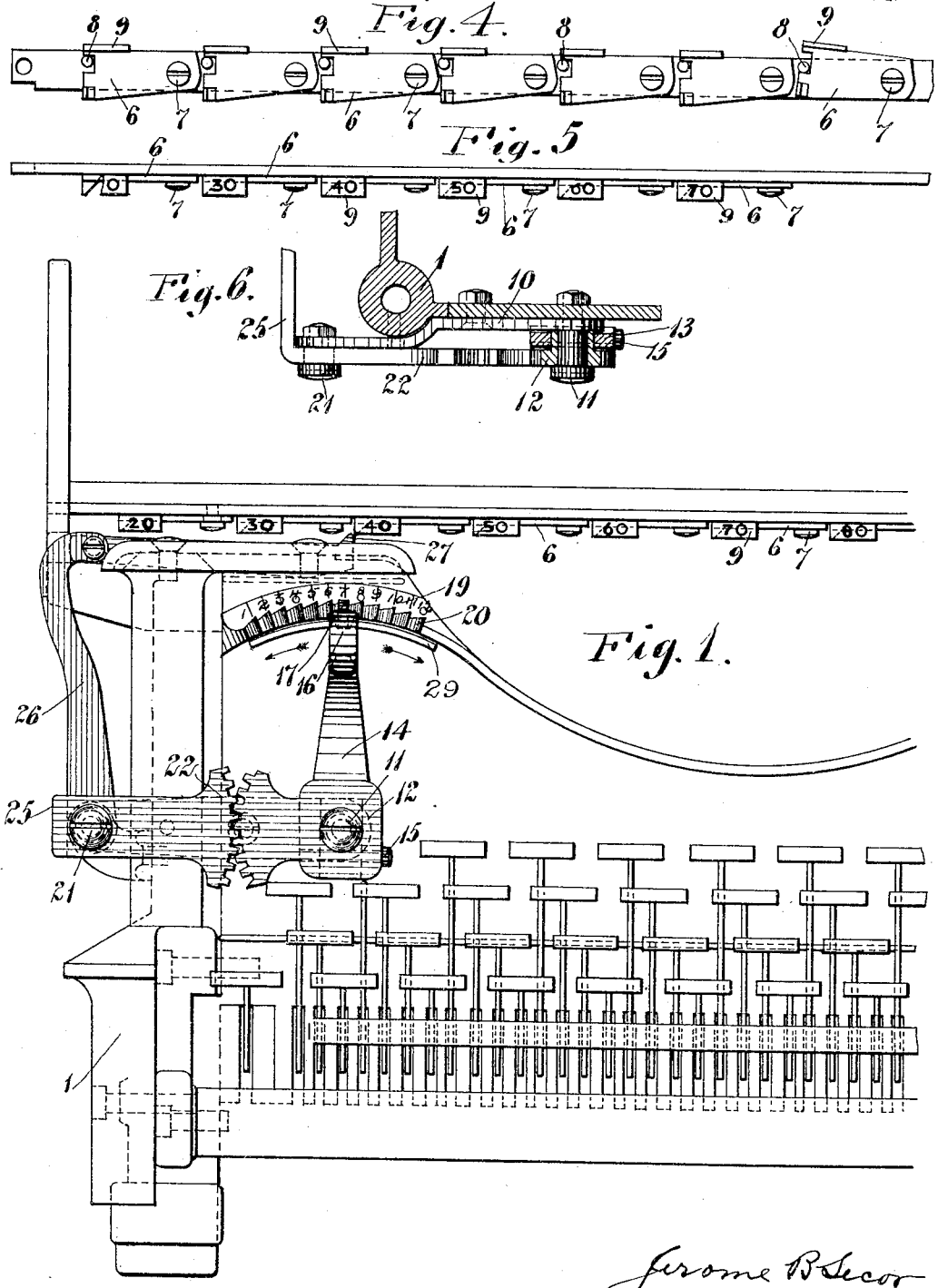

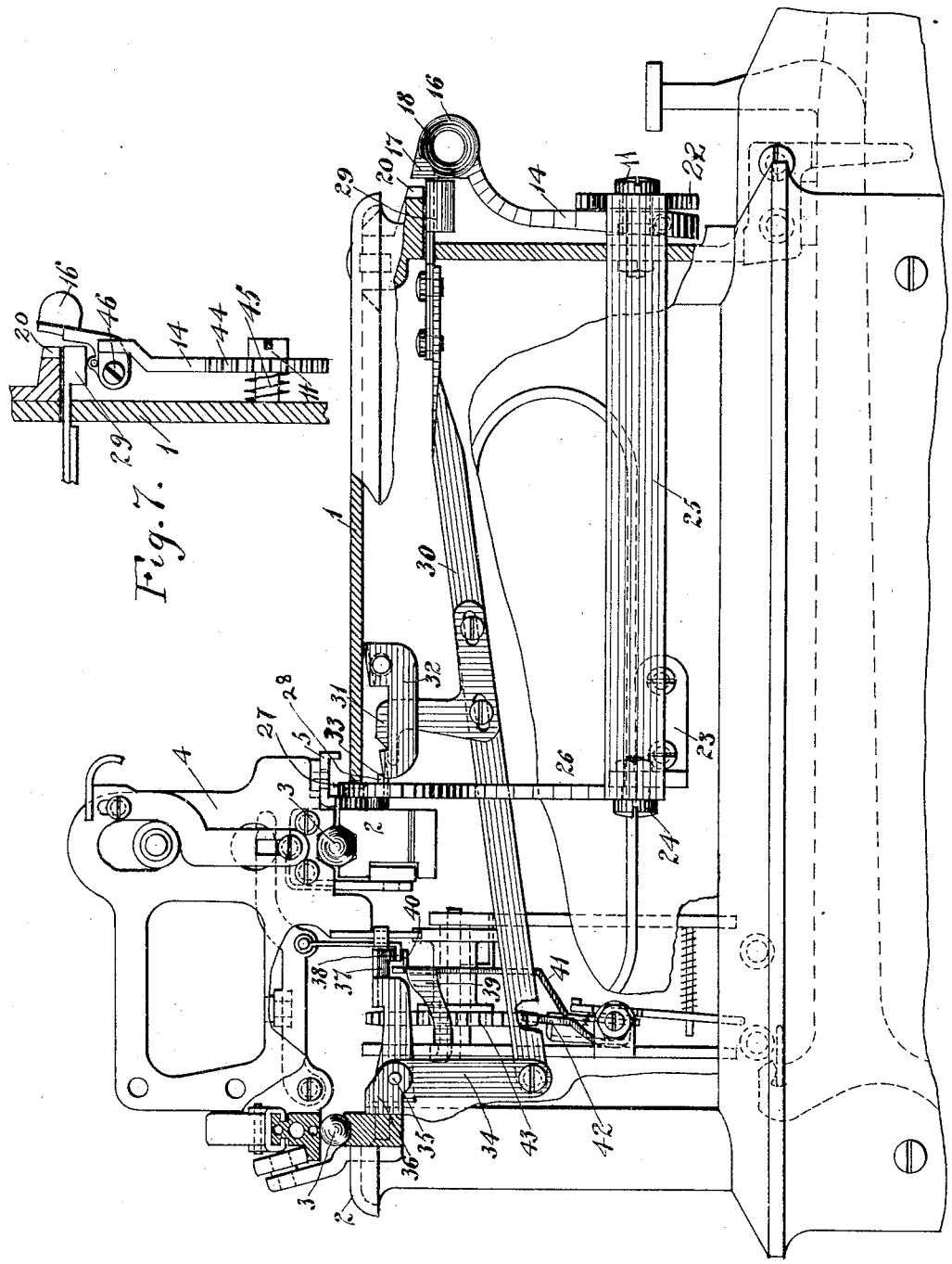

No. 767,839. Patented August 16, 1904.

UNITED STATES PATENT OFFICE.

JEROME B. SECOR, OF DERBY, CONNECTICUT, ASSIGNOR TO THE WILLIAMS TYPEWRITER COMPANY, OF DERBY, CONNECTICUT, A CORPORATION OF IOWA.

TABULATING DEVICE FOR TYPE-WRITING MACHINES.

SPECIFICATION forming part of Letters Patent No. 767,839, dated August 16, 1904.

Application filed October 21, 1903. Serial No. 177,877. (No model.)

*To all whom it may concern:*

Be it known that I, JEROME B. SECOR, a citizen of the United States, residing at Derby, in the county of New Haven and State of Connecticut, have invented certain new and useful Improvements in Tabulating Devices for Type-Writing Machines, of which the following is a specification.

This invention relates to improvements in tabulating devices for type-writing machines, and has for its object to provide a tabulating stop device which will serve as a column-stop and which is adapted to be connected with and automatically actuate the release device or not, as desired.

The invention comprises an adjustable stop device mounted on the frame of the machine and adapted to be used in connection with and moved into the path of a series of dogs mounted on the carriage of the type-writer—such, for instance, as shown in my application for Letters Patent filed July 9, 1903, and serially numbered 164,819. In such application I have shown a range of dogs mounted at fixed distances apart from end to end of the carriage by pivots or otherwise, so as to adapt them to be separately slid transversely to the carriage into or out of coöperating position with relation to the stop device on the frame, such carriage-dogs being mounted at suitable distances asunder on the carriage to provide for printing as many columns as desirable from side to side of the paper carried by the platen. In the invention described in the said application and in the present invention such carriage-dogs and also the stop device on the carriage-frame rest normally in retracted position, leaving the carriage free for ordinary type-writing work, the type-writer acting satisfactorily without regard to the position of the dogs on the carriage—that is, whether the same are set or not—while the tabulator will act only with reference to those dogs on the carriage which have been set. When column work is to be done, the selected carriage-dogs are set into operative position to locate the several columns, and the stop device on the frame is moved into operative relation to the carriage-dog to determine the decimal value of the first figure to be printed in the column. In the invention described in the said application the operation of the stop device on the machine-frame was not dependent upon or connected with the operation of the release-lever. In the present application I have shown an adjustable stop device which may be and preferably is connected with the release-lever of the machine or which may be employed without being connected to said release-lever.

The present invention relates particularly to a stop device mounted on the machine-frame, which need not be restricted to use with any particular form of carriage-stop dogs and which is simple of construction, highly efficient in use, and adapted to be operated by a single key or lever.

Further objects of my invention are to provide a suitable means whereby the release-lever of the type-writing machine may be actuated automatically upon the operation of the said stop device.

In the accompanying drawings I have shown a practical application of my improved tabulating mechanism to a type-writing machine, showing only those parts of the machine which are necessary to illustrate the invention.

In the drawings like reference-numerals refer to like parts.

Figure 1 represents a front view of a portion of a type-writing machine provided with my improved tabulating mechanism. Fig. 2 is a longitudinal sectional view of the same. Fig. 3 is a plan view of the same. Fig. 4 is a bottom view of a portion of the front bar of the carriage, showing a series of marginal or column-stop dogs mounted thereon. Fig. 5 is an edge view of the same. Fig. 6 is a detail sectional view showing a portion of the machine-frame and the key-mounting of my improved tabulating mechanism. Fig. 7 is a detail view showing modifications in the tabulator key or lever and its mounting.

Referring now in detail to the drawings, 1 represents the machine-frame, having mounted thereon the carriage track-bar 2, in which travel balls 3, which support the carriage 4.

5 is the front bar of the carriage 4, having pivotally mounted thereon a series of marginal or column-stop dogs 6, pivoted at 7 and movable transversely to the direction of travel of the carriage 4. The dogs 6 rest normally in retracted position and when operated are adapted to be thrown into the path of the stop device hereinafter described and mounted on the carriage-frame. The movement of each of the dogs 6 is limited by the pins 8 engaging the notches 9 in the said dogs.

Thus far the mechanism described has been disclosed in the application hereinbefore referred to and does not form a part of my present invention. I will now proceed to describe my improved stop device mounted on the frame of the machine to be used in coöperation with the foregoing carriage-dogs.

Bolted at the front of the frame 1 of the machine is a bracket 10, through one end of which passes the joint-screw 11, on which is pivotally mounted a segmental gear 12, having a squared shoulder 13, adapted to abut the bracket 10 and space the gear 12 therefrom.

14 is a lever provided with a U-shaped lower end adapted to fit snugly on the shoulder 13 and being secured on said shoulder by a pin 15. Lever 14 is of slightly lesser thickness than the space between the gear 12 and the bracket 10, allowing for a slight vibratory movement, and is curved forward upwardly and forms at its upper end a key 16, having a tooth 17 and a cup-shaped gripping depression 18.

Positioned above the joint-screw 11 on the frame is a scale 19, having suitable indicia thereon, and teeth 20, arranged radially from the joint-screw 11. The teeth 20 are cut at right angles to the face of scale 19 on the right and are beveled from the bottom upwardly to the left in the form of ordinary ratchet-teeth. Pivotally mounted at 21 on bracket 10 is a segmental gear 22, engaging the teeth on the gear 12.

23 is a bracket supporting a joint-screw 24, on which is pivotally mounted an extension 25 of the segmental gear 22, which extends at right angles to the said gear 22.

26 is a link rigidly secured at its lower end to the link 25 and pivotally connected at its upper end to a pawl 27, slidably mounted in a slot in the top of the frame 1. Pawl 27 is provided with a lug 28, adapted to prevent the removal of the pawl 27 from its slot, but allowing a limited pivotal movement of the said pawl. As shown in the drawings, the pawl 27 is in suitable position to be elevated into the path of any one of the carriage-dogs 6 which may be set to engage the same.

In order to automatically elevate the pawl 27, I have provided a push-bar 29, located immediately beneath the teeth 20 in position to be pressed in upon engagement of the actuating-key with the teeth 20. The push-bar 29 is made in length about equal to the scale 19 and series of teeth 20, as shown in Figs. 1 and 3, so as to adapt it to be acted on by the lever 14 in any angular position to which this may be deflected to the right or left. The push-bar 29 is provided with extension 30, extending rearwardly through the machine, having adjustably mounted thereon an elevating-finger 31.

Pivotally mounted above the elevating-finger 31 in position to be raised thereby is a frame 32, carrying a plate 33, resting immediately under and in engagement with the pawl 27. It is obvious that plate 33 may constitute a rigid extension of the finger 31, and the frame 32 may be thus done away with.

In the operation of my improved tabulating mechanism the operator grasping the key 14 at the cup-shaped gripping depression 18 and moving the same to the left forces the pawl 27 to a desired point on the scale 19, indicating the point in the travel of the carriage where it is desired to have the stop 27 intercepting a selected carriage-dog to determine the value of the first figure in the column of the figures to be recorded. It will be readily seen that the movement of the lever 14 communicates motion to the gear 12, through gear 12 to the gear 22, and thence from the extension 25 and link 26 to the pawl 27. The scale 19 is preferably provided with three groups of short straight lines separated by decimal points to indicate hundreds, thousands, and millions, or any suitable indicia may be employed to indicate the same. The scale 19 reads in the same direction as the travel of the carriage, and I am enabled to have the same read thus because of the segmental gear which reverses the movement of the parts. The use of the gearing between the key-lever 14 and the movable stop enables me to make the index-notches on the scale of greater distance apart than the spacing of the lettering on the printed sheet carried by the platen because of the difference of diameter of the gears 22 and 12, thereby making it much easier to find the desired point or notch on the scale 19. It it obvious, however, that the key-lever 14 may be mounted on the same axis with the extension 25, in which event, of course, the scale would have to read in the opposite direction. It will be readily seen that through the provision of the scale 19 and the graduated carriage-dogs 6, having on the latter suitable indicia, the operator can bring the carriage after having set the desired dog 6 to any position in its travel through the forcing into engagement with the desired tooth 20 of the key 16 and releasing the carriage from its escapement dog or dogs, which may be done through use of the usual release-bars or through the automatic release mechanism hereinafter described. In forcing the key 16 into engagement with the particular tooth 20 the push-bar 29 is forced inwardly, pushing the finger 31 beneath the shoe 32 and through the lip 33, forcing the pawl upwardly into the path of the particular dog 6 which has been set.

In the drawings I have shown as a part of my invention an automatic release device, whereby upon manipulation of the key 16 and forcing the said key into engagement with the particular tooth 20 the carriage may be released to travel until stopped by the engagement of the particular dog 6 on the said pawl 27. Such an arrangement consists in an elongation to the extension 30, pivotally secured at its rear end to a link 34, extending upwardly from the bar 30 and rigidly connected to a pin in 35, journaled in a U-frame 36. 37 is a shoe positioned above the general release-bar 38, having rearward extension suitably bent and rigidly mounted on the pin 35. When the bar 30 is forced inwardly, the link 34 is forced rearwardly, turning the pin 35 and through the same depressing the shoe 37, forcing down the general release-bar 38, releasing the carriage to travel until stopped by the dogging means. Any suitable means may be used for throwing out the escapement when the general release-bar is actuated. In the present instance I have shown merely to illustrate the principle of operation a part of an escapement mechanism of my own, which, however, does not form an essential part of my present invention. Therein I employ the frame 39, fulcrumed to the frame of the machine and having a lip 40 immediately beneath the general release-bar 38. Extending rearwardly from the frame 39 is the arm 41, bent rearwardly to engage an escapement-dog 42 and to force the same out of engagement with an escapement-wheel 43 when the general release-bar 38 is depressed.

In Fig. 7 I have shown slight modifications in the mounting of the lever 14 and in the structure of the same and of the key 16. Therein I have made the lever 14 with an extension 44, forming the segmental gear 12, adapted to the gear 22. I have also shown the lever 14, controlled by a spring 45, mounted on the joint-screw 11, adapted to hold the lever 14 normally at the right end of the scale 19. In order to provide for the vibration of the key 16, I have made the same separate from the lever 14 and pivoted thereto at 46.

Having thus described my invention, the following is what I claim as new therein and desire to secure by Letters Patent:

1. In a tabulating mechanism for type-writing machines, the combination with the machine-frame, the carriage, the carriage-feed mechanism and the stop devices mounted on the carriage, of the adjustable stop mounted on the machine-frame, an operating-lever connected to said stop for preliminarily adjusting the same, independent mechanism actuated by said lever after such preliminary adjustment for projecting the said stop into the path of the stop devices on the carriage and for releasing the carriage from its escapement.

2. In a tabulating mechanism for type-writing machines, the combination with the machine-frame, the carriage, the carriage-feed mechanism, and the stop devices mounted on the carriage, of the longitudinally-adjustable stop mounted on the machine-frame, the pivotally-mounted operating-lever capable of oscillation in two directions, and connected to said adjustable stop to adjust said stop longitudinally when oscillated in one direction, and independent means actuated by said lever when oscillated in the other direction for projecting said stop into the path of the stop devices on the carriage.

3. In a tabulating mechanism for type-writing machines, the combination with the machine-frame, the carriage, the carriage-feed mechanism, and the stop devices mounted on the carriage, of the longitudinally-adjustable stop mounted on the machine-frame, the oscillatorily-mounted pivot-shaft, the operating-lever pivoted to said shaft to oscillate in a direction transverse to the oscillation of said shaft, suitable connection between said lever and the stop to adjust the latter upon movement of the former with said shaft, and independent mechanism actuated after such adjustment by the independent movement of the lever for projecting the stop into the path of the stop devices on the carriage.

4. In a tabulating mechanism for type-writing machines, the combination with the machine-frame, the carriage, the carriage-feed mechanism, and the stop devices mounted on the carriage, of an adjustable stop mounted on the machine-frame, an operating-lever connected to said stop for preliminarily adjusting the same longitudinally of the carriage, and means independent of and actuated by said lever for projecting said stop into the path of the stop devices mounted on the carriage.

5. In a tabulating mechanism for type-writing machines, the combination with the machine-frame, the carriage, the carriage-feed mechanism, and the stop devices mounted on the carriage, of a longitudinally-movable stop mounted on the machine-frame, an operating-lever connected to said stop for adjusting the same longitudinally, and independent mechanism operated by the said lever after such longitudinal adjustment for projecting the said stop transversely of the path of its longitudinal adjustment into the path of the stops mounted on the carriage.

6. In a tabulating mechanism for type-writing machines, the combination with the machine-frame, the carriage, the carriage-feed mechanism, and the stop devices mounted on the carriage, of an adjustable stop mounted on the machine-frame, an operating-lever pivotally mounted and mounted to oscillate in a direction transverse to its pivotal movement, suitable connection between the lever and said stop to adjust the latter upon pivotal movement of the former, and independent mechanism actuated by the transverse oscillatory movement of said lever after said adjustment to project the stop into the path of the stop devices mounted on the carriage.

7. In a tabulating mechanism for type-writing machines, the combination with the machine-frame, the carriage, the carriage-feed mechanism, and a stop device mounted on the carriage, of an adjustable stop mounted on the machine-frame, an operating-lever connected to said stop for preliminarily adjusting the same in denominational position, and means independent of and actuated by said lever, after such preliminary adjustment of said stop, to project the same into the path of the stop device on the carriage.

8. In a tabulating mechanism for type-writing machines, the combination with the carriage, dogging means carried thereby, carriage-feed mechanism, and the machine-frame; of a longitudinally-movable denomination-stop mounted on the frame, an actuating-lever pivotally mounted on the frame, rocking mechanism mounted on the frame, connecting means between the rocking mechanism and the denomination-stop to impart longitudinal adjustment thereto, and toothed gearing between said actuating-lever and rocking mechanism whereby longitudinal adjusting movement is communicated to the denomination-stop in a direction opposite to the movement of the actuating-lever.

9. In a tabulating mechanism for type-writing machines, the combination with the carriage, dogging means carried thereby, the carriage-feed mechanism and the machine-frame; of a longitudinally-movable denomination-stop mounted on the frame, an actuating-lever pivotally mounted on the frame, rocking mechanism and connecting means imparting longitudinal movement to the denomination-stop by the movement of the actuating-lever and a push-bar actuated by the said lever and connected to the denomination-stop to shift the latter into the path of the dogging means on the carriage by a movement transverse to the longitudinal movement by which it is made to determine the denominational value of the first character to be printed.

10. In a tabulating mechanism for type-writing machines, the combination with the carriage, dogging means carried thereby, the carriage-feed mechanism and the machine-frame; of a denomination-stop on the frame longitudinally movable to locate it in denomination position and laterally movable to locate it in the path of the dogging means on the carriage, an actuating-lever pivotally mounted on the frame, connecting means between the actuating-lever and the denomination-stop whereby deflection of the said lever in one plane locates the stop in denominational position and deflection of said lever in another plane locates said stop in the path of the carriage-stop dog, and a carriage-release bar having a broad head adjacent to the actuating-lever to adapt it to be actuated by said lever in different angular positions of the latter.

11. In a tabulating mechanism for type-writing machines, the combination with the carriage, dogging means carried thereby, the carriage-feed mechanism, and the machine-frame; of a movable denomination-stop mounted on said frame, an actuating-lever pivotally mounted on the frame, segmental gearing connecting said actuating-lever with said stop to produce a movement of the stop proportionate with any movement of the actuating-lever, a push-bar adapted to engage and be actuated by said actuating-lever, suitable connection between the stop and said push-bar to elevate the stop upon the actuation of said bar, and suitable connection between said push-bar and the escapement mechanism to release the carriage from said escapement mechanism upon operation of the push-bar.

12. In a tabulating mechanism for type-writing machines, the combination with the carriage, a column-stop dog carried thereby, the carriage feed and escapement and release mechanism and the machine-frame; of a movable denomination-stop 27 mounted on said frame, an actuating-lever 14 mounted on the frame, a rocking bar 25 actuated by the oscillation of said lever, means intermediate the rocking bar 25 and denomination-stop 27 whereby the said stop is moved longitudinally to locate it in different denomination positions by the oscillation of said rocking bar, a range of teeth 20 with which the head of the lever 14 engages in different deflected positions of said lever corresponding with the denominational value of the resultant position of the stop 27, a push-bar 29 adjacent the teeth 20 and of approximately equal length to the range of teeth, adapting it to be engaged by the actuating-lever in any position to which it may be deflected, a push-rod 30 connected to the bar 29 and release means intermediate the said push-rod and the carriage-escapement mechanism whereby the denomination-stop is located longitudinally by lateral deflection of the actuating-lever and the carriage is released by the subsequent pressure of the lever on the push-bar 29.

13. In a tabulating mechanism for type-writing machines, the combination with the carriage, a column-stop dog carried thereby, the carriage feed and escapement and release mechanism and the machine-frame; of a movable denomination-stop 27 mounted on said frame, an actuating-lever 14 mounted on the frame, a rocking bar 25 actuated by the oscillation of said lever, means intermediate the rocking bar 25 and denomination-stop 27 whereby the said stop is moved longitudinally to locate it in different denomination positions by the oscillation of said rocking bar, a range of teeth 20 with which the head of the lever 14 engages in different deflected positions of said lever corresponding with the denominational value of the resultant position of the stop 27, a push-bar 29 adjacent the teeth 20 and of approximately equal length to the range of teeth, adapting it to be engaged by the actuating-lever in any position to which it may be deflected, a push-rod 30 connected to the bar 29, means intermediate the push-rod 30 and stop 27 to shift the stop into the path of the carriage-stop dog by endwise movement of the rod 30, and release means intermediate the said push-rod and the carriage-escapement mechanism whereby the denomination-stop is located longitudinally by lateral deflection of the actuating-lever and the denomination-stop is moved into the path of the carriage-stop dog and the carriage is released by the subsequent pressure of the lever on the push-bar 29.

JEROME B. SECOR.

Witnesses:
JAMES P. CLARKE,
GEO. H. PATTERSON.